US008988203B2

(12) United States Patent
Goto

(10) Patent No.: US 8,988,203 B2
(45) Date of Patent: Mar. 24, 2015

(54) VEHICLE PRESENCE NOTIFICATION APPARATUS

(71) Applicant: Denso Corporation, Kariya, Aichi-pref. (JP)

(72) Inventor: Koichi Goto, Kariya (JP)

(73) Assignee: Denso Corporation, Kariya (JP)

( * ) Notice: Subject to any disclaimer, the term of this patent is extended or adjusted under 35 U.S.C. 154(b) by 198 days.

(21) Appl. No.: 13/847,757

(22) Filed: Mar. 20, 2013

(65) Prior Publication Data

US 2013/0249680 A1 Sep. 26, 2013

(30) Foreign Application Priority Data

Mar. 21, 2012 (JP) .................... 2012/064242

(51) Int. Cl.
| B60Q 1/00 | (2006.01) |
| B60Q 5/00 | (2006.01) |
| B60Q 1/26 | (2006.01) |
| G09B 21/00 | (2006.01) |
| G06F 7/00 | (2006.01) |
| B60L 1/00 | (2006.01) |

(52) U.S. Cl.
CPC .............. B60Q 5/001 (2013.01); B60Q 5/008 (2013.01)
USPC ........ 340/425.5; 340/474; 340/459; 340/435; 340/4.1; 701/36; 307/9.1

(58) Field of Classification Search
USPC ............ 340/425, 474, 459, 435, 4.1; 701/36; 307/9.1
See application file for complete search history.

(56) References Cited

U.S. PATENT DOCUMENTS

| 6,307,280 | B1 * | 10/2001 | Harrington et al. .......... 307/10.6 |
| 2007/0257783 | A1 * | 11/2007 | Matsumoto et al. ........ 340/425.5 |
| 2009/0066499 | A1 * | 3/2009 | Bai et al. ....................... 340/459 |
| 2011/0051941 | A1 * | 3/2011 | Gratke ............................ 381/58 |

FOREIGN PATENT DOCUMENTS

| JP | 6242172 | 9/1994 |
| JP | 9-307988 | 11/1997 |
| JP | 2003-274491 | 9/2003 |
| JP | 2003274491 | * 9/2003 ............. H04R 29/00 |

* cited by examiner

Primary Examiner — Jennifer Mehmood
Assistant Examiner — Omar Casillashernandez
(74) Attorney, Agent, or Firm — Nixon & Vanderhye P.C.

(57) ABSTRACT

A vehicle presence notification apparatus includes a speaker and a disconnection determination section. The speaker generates a notification sound to outside a vehicle when a driving condition to notify of presence of the vehicle is satisfied. The disconnection determination section determines a disconnection state of the speaker based on an electromotive force generated by the speaker at a time when a vehicle horn mounted in the vehicle is activated.

5 Claims, 4 Drawing Sheets

VEHICLE PRESENCE NOTIFICATION APPARATUS

CROSS REFERENCE TO RELATED APPLICATIONS

The present application is based on and claims priority to Japanese Patent Application No. 2012-64242 filed on Mar. 21, 2012, the contents of which are incorporated in their entirety herein by reference.

TECHNICAL FIELD

The present disclosure relates to a vehicle presence notification apparatus.

BACKGROUND

Conventionally, a vehicle presence notification apparatus that notifies of presence of a vehicle is employed, especially, in a silent vehicle, such as an electric vehicle, a fuel cell vehicle, and a hybrid vehicle. The vehicle presence notification apparatus includes a speaker that generates a notification sound to outside the vehicle. A volume of the notification sound is set so that the notification sound can notify the surrounding area of presence of the vehicle while taking into consideration vehicle noise. In other words, the volume of the notification sound is smaller than a warning sound generated by a vehicle horn.

Thus, in the interior of the vehicle having a high sound insulation, it is difficult to hear the notification sound generated to outside the vehicle. Even in a state where a window is open and outside sound enters the interior of the vehicle, it is difficult to hear the notification sound in the interior of the vehicle due to load noise. In this state, even if a disconnection of the speaker is caused by some kind of failure and the notification sound is not emitted to outside, a user may not notice the absence of the notification sound and the vehicle may run without the notification sound.

Although it is not mounted in a vehicle, JP-A-2003-274491 discloses disconnection detection means for detecting disconnection of a speaker.

The disconnection detection means detects the presence or absence of disconnection of a speaker circuit in a broadcasting facility. The disconnection detection means includes (a) a speaker circuit coupled with a speaker for broadcasting, (b) an equivalent circuit having the same impedance with the speaker circuit, and (c) a disconnection detection circuit that determines the presence or absence of disconnection of the speaker circuit based on a difference between a voltage at a time when the speaker circuit is driven by an alternating current signal and a voltage at a time when the equivalent current is driven by the alternating current signal.

Thus, the disconnection detection means disclosed in JP-A-2003-274491 needs a switching circuit that switches between the speaker circuit and the equivalent circuit and the equivalent circuit using a dummy resistor having the same impedance with the speaker.

The dummy resistor is a resistor that needs a high breakdown voltage for exchanging energy generated by the speaker to heat when the dummy resistor is switched from the speaker and is driven by the alternating current. Even through the dummy resistor is used only at a disconnection detection, the dummy resistor is generally large, heavy, and expensive. Thus, it is undesirable to mount the dummy resistor in the vehicle. Specifically, if a disconnection of the speaker of the vehicle presence notification device is detected using the technique disclosed in JP-A-2003-274491, a size, a weight, and a cost of the vehicle present notification device may be increased.

SUMMARY

It is an object of the present disclosure to provide a vehicle presence notification apparatus that can detect a disconnection of a speaker for generating a notification sound while restricting increase in size, weight, and cost.

A vehicle presence notification apparatus according to an aspect of the present disclosure includes a speaker and a disconnection determination section. The speaker generates a notification sound to outside a vehicle when a driving condition to notify of presence of the vehicle is satisfied. The disconnection determination section determines a disconnection state of the speaker based on an electromotive force generated by the speaker at a time when a vehicle horn mounted in the vehicle is activated.

Because the vehicle presence notification apparatus can detect the disconnection state of the speaker without a dummy resistor, which causes increase in size, weight, and cost, the vehicle presence notification apparatus can detect a disconnection of the speaker while restricting increase in size, weight, and cost.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
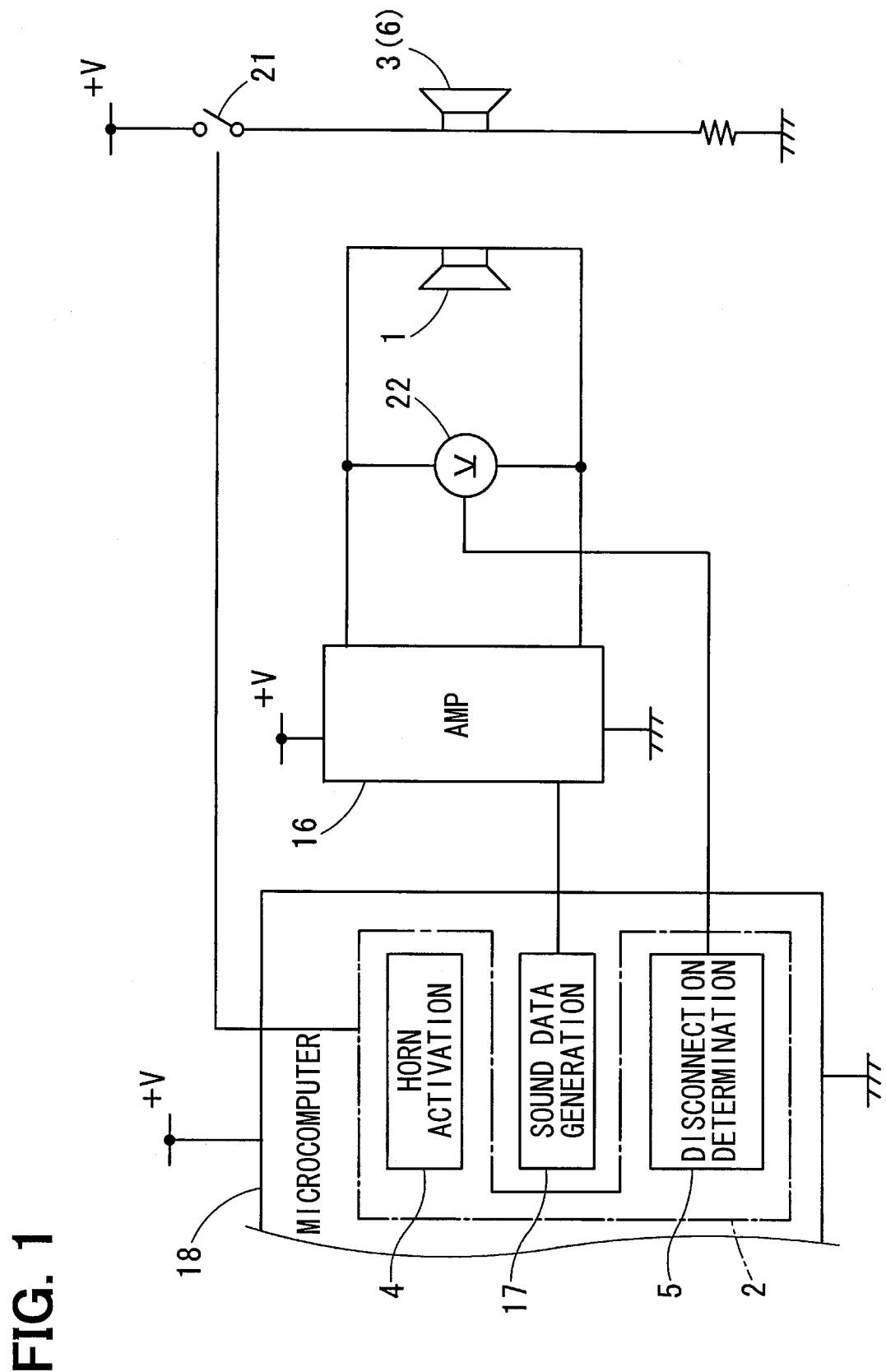
FIG. 1 is a diagram showing a vehicle presence notification apparatus according to a first embodiment of the present disclosure.

Embodiments of the present disclosure will be described with reference to accompanying drawings. A vehicle presence notification apparatus generates a notification sound to outside a vehicle when a driving condition to notify of presence of the vehicle is satisfied. The vehicle presence notification apparatus includes a speaker 1 that generates the notification sound. The speaker 1 may be a dynamic speaker that directly generates the notification sound. The dynamic speaker includes a piezoelectric speaker for generating an audible sound. The speaker 1 may also be an ultrasonic wave speaker (ultrasonic wave generator) used in a parametric speaker.

The vehicle presence notification apparatus further includes a disconnection detector 2 that detects a disconnection state of the speaker 1. The disconnection detector 2 includes a horn activation section 4 and a disconnection determination section 5. The horn activation section 4 activates a vehicle horn 3 mounted in the vehicle to generate a warning sound. The disconnection determination section 5 determines the disconnection state of the speaker 1 based on an electromotive force generated by the speaker 1 at a time when the vehicle horn 3 is activated.

(First Embodiment)

A vehicle presence notification apparatus according to a first embodiment of the present disclosure will be described with reference to FIG. 1 to FIG. 3. The vehicle presence notification apparatus is mounted in a vehicle that is silent during running and stopping, such as a vehicle in which an engine is not mounted (e.g., an electric vehicle and a fuel cell vehicle) and a vehicle in which an engine may be stopped during running and stopping (e.g., a hybrid vehicle).

The vehicle includes a vehicle horn 3 that generates a warning sound. The vehicle horn 3 generates the warning sound when a horn switch (e.g., a horn button attached to a steering) is operated by a user. For example, the vehicle horn 3 is fixed between a front grille (a grille disposed at an inlet of running wind) disposed at a front portion of the vehicle and a heat exchanger (e.g., a heat exchanger for air conditioning and a radiator).

A configuration of the vehicle horn 3 is not limited. In the present embodiment, for example, an electromagnetic warning device is used as the vehicle horn 3. The vehicle horn 3 includes a warning sound generator 6 and a spiral acoustic tube 7. The warning sound generator 6 generates the warning sound by receiving electric current. The spiral acoustic tube 7 amplifies the warning sound generated by the warning sound generator 6 and emits the amplified warning sound to outside. The spiral acoustic tube 7 is an example of an acoustic tube.

A basic configuration of the warning sound generator 6 is known. The warning sound generator 6 includes a coil 11, a fixed core (a magnetic attraction core) 12, a movable core 14, and a current interrupter 15. The coil 11 generates a magnetic force by receiving electric current. The fixed core 12 generates a magnetic attractive force due to the magnetic force generated by the coil 11. The movable core 14 is held at a center portion of a diaphragm 13 so as to be movable toward the fixed core 12. The current interrupter 15 continuously interrupts an energizing circuit of the coil 11 when the coil 11 receives electric current.

The spiral acoustic tube 7 is a spiral horn having a trumpet member whose sound passage expands from a horn inlet (an acoustic inlet) toward a horn outlet (an acoustic outlet). The warning sound generator 6 is attached to a side surface of the spiral acoustic tube 7. The side surface of the spiral acoustic tube 7 is a surface perpendicular to an axis extending along a spiral center. For example, the warning sound generator 6 is attached to the side surface of the spiral acoustic tube 7 disposed adjacent to the heat exchanger. The warning sound generator 6 generates the warning sound to the horn inlet.

On the other hand, the vehicle presence notification apparatus generates a notification sound (e.g., fake engine noise, chord, voice, and music) to outside the vehicle when a driving condition to notify of presence of the vehicle is satisfied so as to notify pedestrians of the presence of the vehicle. The vehicle presence notification apparatus includes a speaker 1, a driving amplifier 16, and a microcomputer 18. The speaker 1 generates the notification sound. The driving amplifier 16 drives the speaker 1. The microcomputer 18 includes a sound data generation section 17 that supplies an acoustic signal forming the notification sound to the driving amplifier 16. The acoustic signal may be an analog audio signal or a digital audio signal.

The speaker 1 is a small piezoelectric speaker that includes a piezoelectric element and a diaphragm. The piezoelectric speaker is an example of a capacitive speaker. The piezoelectric element expands and contracts in accordance with applied voltage (charge and discharge). The diaphragm is driven by the expansion and contraction of the piezoelectric element and generates compressional waves in air. The piezoelectric speaker used in the present embodiment generates sound waves in an audible band. A primary resonance part (primary resonance frequency) of a vibration system (the piezoelectric element and the diaphragm) of the piezoelectric speaker is in the audible band (e.g., about 2 kHz).

Figure 3:
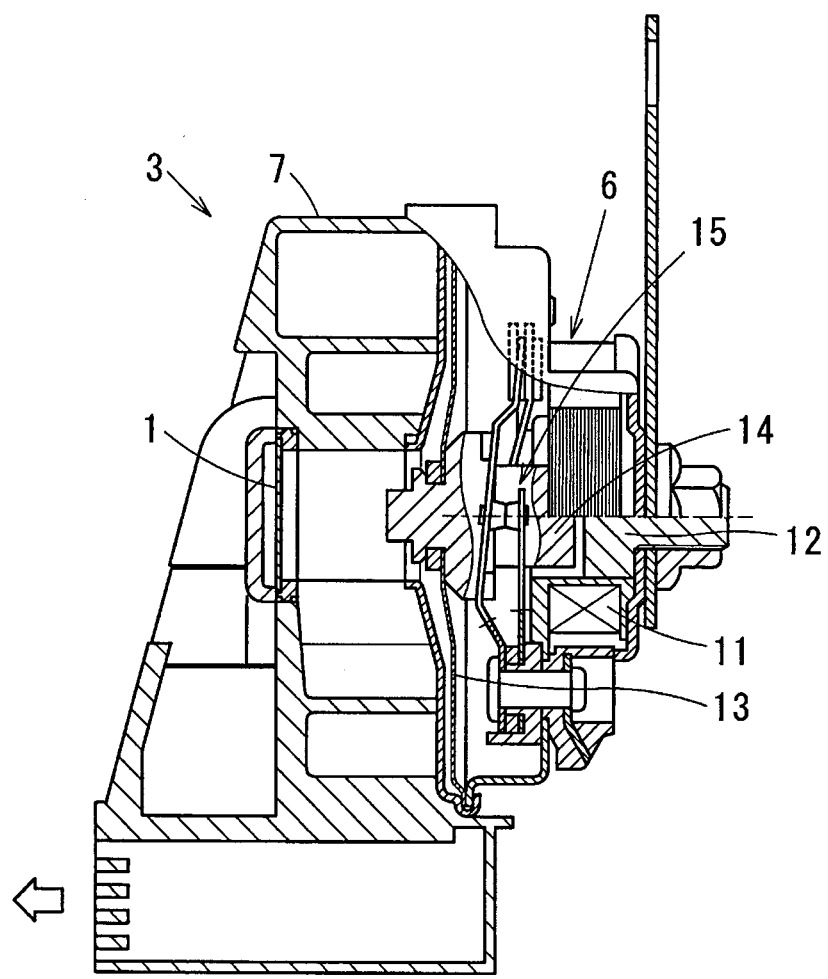
FIG. 3 is a cross-sectional view of a vehicle horn in which a speaker for generating a notification sound is mounted.

An example of a mounting position and a mounting way of the speaker 1 are shown in FIG. 3. The speaker 1 is attached to the spiral acoustic tube 7 of the vehicle horn 3 so as to emit the notification sound to inside the spiral acoustic tube 7. For example, the speaker 1 is disposed at a position opposing the warning sound generator 6 at an approximately center portion of the spiral acoustic tube 7. The notification sound is amplified by the spiral acoustic tube 7 and is emitted to outside the vehicle.

The speaker 1 used in the present embodiment is a small dynamic speaker. Thus, it is difficult to generate low-frequency compressional waves only with the speaker 1, and a sound pressure of a low-pitched tone cannot be increased. Thus, in the present embodiment, as shown in FIG. 3, the speaker 1 is attached to the spiral acoustic tube 7 so that the speaker 1 emits the notification sound to the center portion (i.e., the horn inlet) of the spiral acoustic tube 7. Accordingly, even in cases where the speaker 1 is small, aerial vibration generated by the speaker 1 is damped by the spiral acoustic tube 7, and low-frequency aerial vibration is emitted to outside the spiral acoustic tube 7 as a low-pitched sound (sound wave) without missing. Thus, even in cases where the speaker 1 is small, the sound pressure of the low-pitched sound can be increased, and the notification sound including the low-pitched sound can be generated.

The microcomputer 18 receives vehicle information (e.g., speed signal) of a running state of the vehicle from an engine control unit (ECU) and the like. When the driving condition to notify of presence of the vehicle is satisfied, the acoustic signal forming the notification signal is applied from the sound data generation section 17 to the driving amplifier 16 to enable the speaker 1 to generate the notification sound.

The driving amplifier 16 is an amplification section that drives the speaker 1 in response to the acoustic signal forming the notification sound generated by the sound data generation section 17. For example, the driving amplifier 16 may be a class-B amplifier or a class-D amplifier. The driving amplifier 16 controls the voltage applied to the speaker 1 (specifically, the charge and discharge state of the piezoelectric element) so as to enable the speaker 1 to generate the sound waves forming the notification sound (audible sound).

The vehicle presence notification apparatus according to the present embodiment includes a disconnection detector 2 that detects the disconnection state (in the present embodiment, the presence or absence of a disconnection) of the speaker 1. The disconnection detector 2 includes a horn activation section 4 and a disconnection determination section 5. When a disconnection detection condition is satisfied, the horn activation section 4 temporarily activates the vehicle horn 3 to temporarily generate the warning sound from the vehicle horn 3. The disconnection determination section 5 determines the disconnection state of the speaker 1 based on an electromotive force generated by the speaker 1 at a time when the horn activation section 4 activates the vehicle horn 3, that is, at a time when the vehicle horn 3 generates the warning sound by the horn activation section 4.

The horn activation section 4 activates the vehicle horn 3 only for a short time (e.g., less than 1 second) when the condition of the disconnection detection is satisfied, for example, during a preparation period just after a driving switch of the vehicle is turned on and the driving amplifier 16 does not operate. For example, the horn activation section 4 executes a control program in the microcomputer 18 and controls an on-off state of a first switch 21. The first switch 21 enables and disables application of electric current from a battery (shown as +V in FIG. 1) and the vehicle horn 3 (specifically, the coil 11 in the warning sound generator 6). When the condition of the disconnection detection is satisfied, the horn activation section 4 temporarily activates the first switch 21 to generate the warning sound from the vehicle horn 3 for the short time.

Figure 2A:
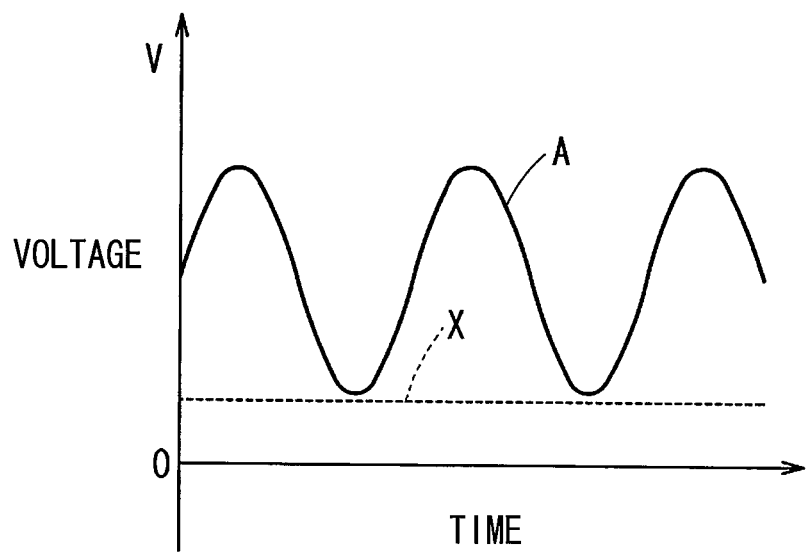
FIG. 2A is a diagram showing a voltage generated by a speaker at normal time.
Figure 2B:
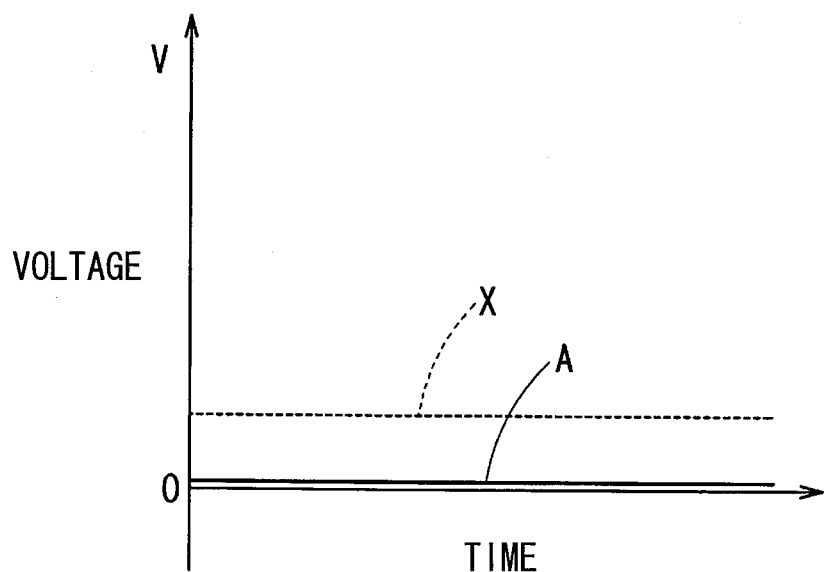
FIG. 2B is a diagram showing a voltage generated by the speaker at a disconnection.

The disconnection determination section 5 executes a control program in the microcomputer 18 and determines the disconnection state of the speaker 1 based on an output signal (the electromotive force of the speaker 1) of a voltage measurement portion 22 that detects voltage between the terminals of the speaker 1. The disconnection determination section 5 determines that the speaker 1 is normal, that is, disconnection of the speaker 1 does not occur, if the electromotive force generated by the speaker 1 at a time when the horn activation section 4 activates the vehicle horn 3 to generate the warning sound is greater than or equal to a predetermined determination value (dashed line X) as shown in FIG. 2A. The disconnection determination section 5 determines that a disconnection of the speaker 1 occurs, if the electromotive force generated by the speaker 1 at a time when the horn activation section 4 activates the vehicle horn 3 to generate the warning sound is less than the predetermined determination value (dashed line X) as shown in FIG. 2B.

The vehicle presence notification apparatus according to the present embodiments determines the disconnection state of the speaker 1 based on the electromotive force generated by the speaker 1 using energy of the warning sound generated by the vehicle horn 3. Thus, the vehicle presence notification apparatus can detect a disconnection of the speaker 1 without a dummy resistor which is unsuitable to be mounted in the vehicle. Because disconnection of the speaker 1 is detected using the energy of the warning sound, the disconnection detector 2 can have a simple configuration. As a result, a disconnection of the speaker 1 can be detected while restricting increase in size, weight, and cost.

The speaker 1 is attached to the spiral acoustic tube 7 in the vehicle horn 3. Thus, the energy of the warning sound generated by the vehicle horn 3 can be used with certainty, and a large electromotive force can be generated when the speaker 1 is normal, that is, when a disconnection of the speaker 1 does not occur. As a result, a difference in electromotive force between the time when the speaker 1 is normal and the time when the disconnection of the speaker 1 occurs can be increased, and the reliability of the detection accuracy of the disconnection of the speaker 1 can be improved.

The speaker 1 emits the notification sound to inside the spiral acoustic tube 7. In other words, a sound generation portion of the speaker 1 is disposed inside the spiral acoustic tube 7. Accordingly, the large energy of the warning sound generated in the spiral acoustic tube 7 is forcibly applied to the speaker 1, and the large electromotive force can be generated with certainty when the speaker 1 is normal, that is, when a disconnection does not occur. As a result, the difference in electromotive force between the time when the speaker 1 is normal and the time when the disconnection of the speaker 1 occurs can be increased, and the reliability of the detection accuracy of the disconnection of the speaker 1 can be improved.

(Second Embodiment)

Figure 4:
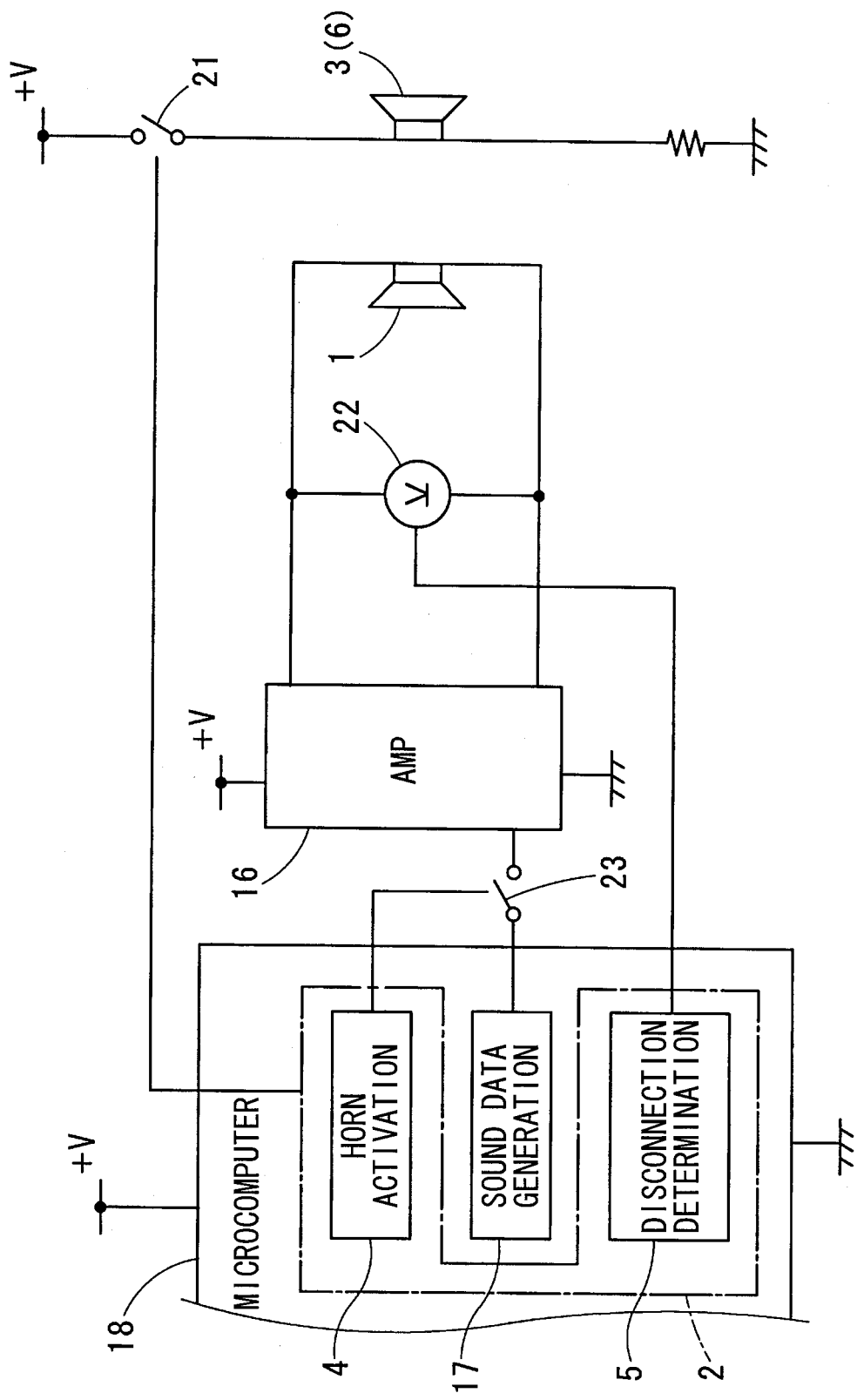
FIG. 4 is a diagram showing a voltage presence notification apparatus according to a second embodiment of the present disclosure.

A vehicle presence notification apparatus according to a second embodiment of the present disclosure will be described with reference to FIG. 4. In the first embodiment, the first switch 21 is activated only for the short time during the preparation period just after the driving switch of the vehicle is turned on, and the disconnection state is detected based on the electromotive force generated by the speaker 1. In the present embodiment, a warning sound generated at a time when a user of the vehicle operates the horn switch is used, and the disconnection state is detected by measuring the electromotive force of the speaker 1 at the time when the user operates the horn switch.

When the user operates the horn switch, the horn activation section 4 activates the first switch 21 to generate the warning sound from the vehicle horn 3.

On a signal line that transmits the acoustic signal forming the notification sound from the sound data generation section 17 to the driving amplifier 16, a second switch 23 that interrupts the signal line is disposed. The second switch 23 deactivates the driving amplifier 16 so that the voltage measurement portion 22 measures only the electromotive force of the speaker 1.

The first switch 21 and the second switch 23 are alternately turned on and off by the horn activation section 4. When the horn activation section 4 activates the vehicle horn 3 to generate the warning sound, the horn activation section 4 turns on the first switch 21 and turn off the second switch 23. When the horn activation section 4 does not activate the vehicle to generate the warning sound, the horn activation section 4 turns off the first switch 21 and turns on the second switch 23.

The vehicle presence notification apparatus according to the present embodiment detects the disconnection of the speaker 1 using the warning sound generated by the operation of the user. Thus, the warning sound does not generated in states when the horn switch is not operated.

(Other Embodiments)

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

In the above-described embodiments, the disconnection state of the speaker 1 that generates the notification sound to the center portion of the spiral acoustic tube 7 is detected as one example. The mounting position of the speaker 1 is not limited. For example, one or more speakers 1 may be disposed at a back portion of the horn outlet disposed toward the vehicle front, and the speakers 1 may generate the notification sound toward the vehicle front through the horn outlet. One or more speakers 1 may also be disposed in front of (vehicle front position) of the spiral acoustic tube 7, and the speakers 1 may generate the notification sound toward the vehicle front. One or more speakers 1 may also be disposed separately from the vehicle horn 3, and the disconnection state of the speaker 1 may be detected using the acoustic energy of the warning sound generated by the vehicle horn 3.

In the above-described embodiments, the vehicle presence notification apparatus detects the presence or absence of a disconnection of one speaker 1 as one example. The vehicle presence notification apparatus may detect disconnection states, such as the number of disconnections, of two or more speakers 1. For example, the vehicle presence notification apparatus may detect the number of disconnections in two or more speakers 1 based on a combined value of electromotive forces (i.e., a combined electromotive force) generated by the two or more speaker 1 when the vehicle presence notification apparatus activates the vehicle horn 3 to generate the warning sound.

When the vehicle presence notification apparatus detects the number of disconnections of two or more speakers 1, the vehicle presence notification apparatus may include a correction section that executes a program of correcting the combined electromotive force used for determining the number of disconnection or a determination guideline value used for determining the number of disconnections based on a temperature of the speakers 1. In such as case, the vehicle presence notification apparatus may detect the temperature of the speakers 1 using a thermistor or may receive data of the temperature from an existing device.

The vehicle presence notification apparatus may also include a discrimination section that executes a program of discriminating deterioration with age from disconnection by comparing the electromotive force detected at the last disconnection detection and the electromotive force detected at the present disconnection detection.

In the above-described embodiments, the capacitive speaker is used as the example of the speaker 1. However, the vehicle presence notification apparatus may also include an electromagnetic speaker using a voice coil, such as a cone speaker.

In the above-described embodiments, the vehicle presence notification apparatus generates the notification sound only from the speaker 1 as one example. The vehicle presence notification apparatus may also generate the notification sound also from the warning sound generator 6 of the vehicle horn 3 at the same time.

What is claimed is:

1. A vehicle presence notification apparatus comprising:
   a speaker that generates a notification sound to outside a vehicle when a driving condition to notify of presence of the vehicle is satisfied; and
   a disconnection determination section that determines a disconnection state of the speaker based on an electromotive force generated by the speaker at a time when a vehicle horn mounted in the vehicle is activated.

2. The vehicle presence notification apparatus according to claim 1, further comprising
   a horn activation section that activates the vehicle horn,
   wherein the disconnection determination section determines the disconnection state of the speaker based on the electromotive force generated by the speaker at a time when the horn activation section activates the vehicle horn.

3. The vehicle presence notification apparatus according to claim 1,
   wherein the speaker is attached to an acoustic tube of the vehicle horn.

4. The vehicle presence notification apparatus according to claim 3,
   wherein the speaker is attached to the acoustic tube of the vehicle horn so that the speaker emits the notification sound to inside the acoustic tube and emits the notification sound to outside the vehicle through the acoustic tube.

5. The vehicle presence notification apparatus according to claim 1,
   wherein the speaker is a capacitive speaker that generates sound waves based on change in accumulated voltage.

* * * * *